(12) United States Patent
Kim

(10) Patent No.: US 11,531,210 B2
(45) Date of Patent: Dec. 20, 2022

(54) CAMERA MODULE

(71) Applicant: Samsung Electro-Mechanics Co., Ltd., Suwon-si (KR)

(72) Inventor: Gyu Won Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 338 days.

(21) Appl. No.: 16/736,031

(22) Filed: Jan. 7, 2020

(65) Prior Publication Data
US 2021/0096389 A1    Apr. 1, 2021

(30) Foreign Application Priority Data

Sep. 30, 2019    (KR) .......................... 10-2019-0121004

(51) Int. Cl.
*G02B 27/64*    (2006.01)
*H04N 5/232*    (2006.01)
*H04N 5/225*    (2006.01)
*G03B 3/10*    (2021.01)

(52) U.S. Cl.
CPC ............. *G02B 27/646* (2013.01); *G03B 3/10* (2013.01); *H04N 5/2253* (2013.01); *H04N 5/2254* (2013.01); *H04N 5/2257* (2013.01); *H04N 5/23287* (2013.01)

(58) Field of Classification Search
CPC .......... G02B 27/646; G03B 3/10; G03B 5/00; G03B 19/22; G03B 2205/0015; G03B 2217/005; G03B 13/36; H04N 5/2253; H04N 5/2254; H04N 5/2257; H04N 5/23287; H04N 5/23258; H04N 5/2251; H04N 5/2258
See application file for complete search history.

(56) References Cited

U.S. PATENT DOCUMENTS

| | | | |
|---|---|---|---|
| 10,382,687 B1 | 8/2019 | Patel et al. | |
| 11,277,563 B2 * | 3/2022 | Min | H04N 5/2258 |
| 2009/0040317 A1 | 2/2009 | Park et al. | |
| 2014/0333725 A1 | 11/2014 | Park | |
| 2015/0319365 A1 | 11/2015 | Lloyd et al. | |

(Continued)

FOREIGN PATENT DOCUMENTS

| | | |
|---|---|---|
| CN | 108337381 A | 7/2018 |
| CN | 108476277 A | 8/2018 |

(Continued)

OTHER PUBLICATIONS

Chinese Office Action dated Nov. 3, 2022, in counterpart Chinese Patent Application No. 202010235916.0 (6 Pages in Chinese, 3 Pages in English).

*Primary Examiner* — Nelson D. Hernández Hernández
(74) *Attorney, Agent, or Firm* — NSIP Law

(57) ABSTRACT

A camera module includes a gyro sensor to generate shaking data; a first driver integrated circuit (IC) to generate a driving signal to move a first lens barrel in at least one direction perpendicular to an optical axis direction, according to the shaking data; and a second driver IC to generate a driving signal to move a second lens barrel in at least one direction perpendicular to the optical axis direction, according to the shaking data. The first driver IC includes a register unit to store the shaking data transferred from the gyro sensor, and the shaking data stored in the register unit is transferred to the second driver IC.

15 Claims, 6 Drawing Sheets

(56) References Cited

U.S. PATENT DOCUMENTS

| | | | |
|---|---|---|---|
| 2017/0126978 A1* | 5/2017 | Yun | ........................ H04N 5/247 |
| 2017/0201684 A1 | 7/2017 | Kang et al. | |
| 2019/0289214 A1 | 9/2019 | Lee et al. | |
| 2021/0250508 A1 | 8/2021 | Fu | |

FOREIGN PATENT DOCUMENTS

| | | |
|---|---|---|
| KR | 10-2009-0015251 A | 2/2009 |
| KR | 10-2013-0077216 A | 7/2013 |
| KR | 10-2017-0019753 A | 2/2017 |
| KR | 10-1888967 B1 | 8/2018 |

* cited by examiner

CAMERA MODULE

CROSS-REFERENCE TO RELATED APPLICATION(S)

This application claims the benefit under 35 USC 119(a) of Korean Patent Application No. 10-2019-0121004 filed on Sep. 30, 2019 in the Korean Intellectual Property Office, the entire disclosure of which is incorporated herein by reference for all purposes.

BACKGROUND

1. Field

The following description relates to a camera module.

2. Description of Background

In general, portable communication terminals such as mobile phones, portable digital/data assistants (PDAs), portable personal computers (PCs), and the like, have become commonly used to transmit image data as well as text or voice data. In order to respond to this trend, to enable image data transmission, image chatting, and the like, camera modules have been standardly installed in portable communication terminals.

In general, a camera module includes a lens barrel having a lens therein and a housing accommodating the lens barrel therein, and includes an image sensor for converting an image of a subject into an electrical signal. A smartphone may employ a camera module using a short-focusing method for photographing an object with fixed focus, but more recently, a camera module including an actuator capable of autofocusing (AF) adjustment has been employed according to technological developments. In addition, such a camera module employs an actuator for an optical image stabilization (01S) function to reduce a resolution degradation caused by shaking.

In order to implement a high performance camera function, a camera module having a plurality of lens barrels is mounted on an electronic device. In order to improve an autofocusing function of each of the plurality of lens barrels to reduce a resolution degradation phenomenon, it is necessary to provide different actuators to each of the plurality of lens barrels.

For stable driving of different actuators, different gyro sensors for providing shaking data to each of the different actuators and different memories for providing firmware data to each of the different actuators need to be provided, but when the camera module is provided with a plurality of gyro sensors and a plurality of memories, there is a problem that manufacturing costs may increase, and a size may also increase.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

A camera module that can share a memory storing a gyro sensor and firmware data to which different driver ICs provide shaking data.

In one general aspect, a camera module includes a gyro sensor to generate shaking data; a first driver IC to generate a driving signal to move a first lens barrel in at least one direction perpendicular to an optical axis direction, according to the shaking data; and a second driver IC to generate a driving signal to move a second lens barrel in at least one direction perpendicular to the optical axis direction, according to the shaking data. The first driver IC includes a register unit to store the shaking data transferred from the gyro sensor, and the shaking data stored in the register is transferred to the second driver IC.

The first driver IC and the second driver IC may perform serial peripheral interface bus (SPI) communication.

The first driver IC may include a slave port of the SPI communication, and the second driver IC may include a master port of the SPI communication.

The register unit may include a first register to store raw data and a second register to store modified data. The raw data may correspond to an original copy of the shaking data transferred from the gyro sensor, and the modified data may correspond to a processed copy of the shaking data processed by the first driver IC.

One of the raw data and the modified data may be transferred to the second driver IC.

Data transferred to the second driver IC among the raw data and the modified data may be determined according to a command information of a frame of the slave port.

The first driver IC may include a state register unit to record a change in the shaking data stored in the register unit.

The first driver IC may generate an interrupt signal in response to a state value of the register unit being changed.

The first driver IC may provide the interrupt signal to the second driver IC through a master in slave out (MISO) pin of the slave port.

The second driver IC may read the shaking data stored in the register unit, according to the interrupt signal.

In another general aspect, a camera module includes a first driver integrated circuit (IC) to generate a driving signal to move a first lens barrel in at least one of an optical axis direction and a direction perpendicular to the optical axis direction; and a second driver IC to generate a driving signal to move a second lens barrel in at least one of the optical axis direction and a direction perpendicular to the optical axis direction. The first driver IC includes a nonvolatile memory to store first firmware data for driving the first driver IC and second firmware data for driving the second driver IC. The second firmware data is transferred to the second driver IC.

The second driver IC may include a volatile memory to store the second firmware data.

In another general aspect, a camera module includes an external memory; a first driver integrated circuit (IC) to generate a driving signal to move a first lens barrel in at least one of an optical axis direction and a direction perpendicular to the optical axis direction; and a second driver IC to generate a driving signal to move a second lens barrel in at least one of the optical axis direction and a direction perpendicular to the optical axis direction. The first driver IC includes a nonvolatile memory to store first firmware data for driving the first driver IC, and second firmware data for driving the second driver IC is stored in one of the external memory and the nonvolatile memory.

The external memory may include a slave port of serial peripheral interface bus (SPI) communication, the first driver IC may include a slave port of SPI communication, and the second driver IC may include a master port of SPI communication.

The second driver IC may determine a memory storing the second firmware data among the external memory and the nonvolatile memory, according to a header information of the external memory and the nonvolatile memory.

The second driver IC may change a structure of a frame of the master port in response to a memory storing the second firmware data among the external memory and the nonvolatile memory.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
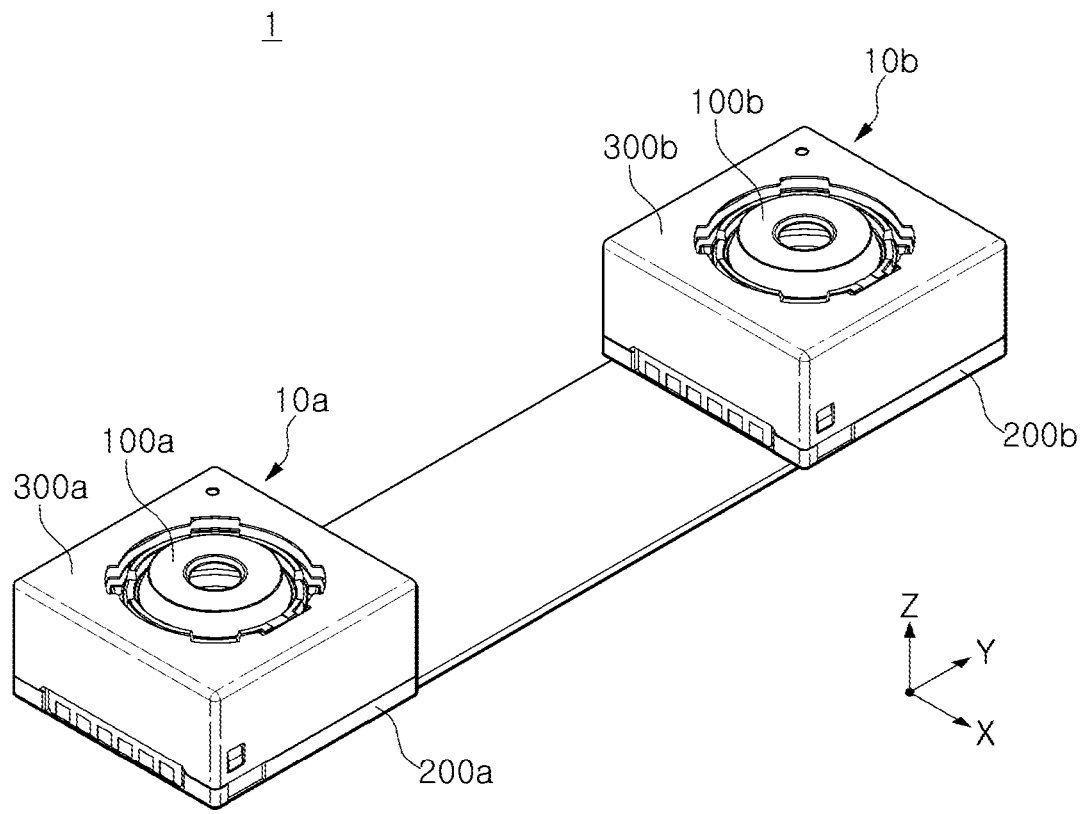
FIG. 1 is a perspective view of a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples will be described in detail with reference to the accompanying drawings.

FIG. 1 is a perspective view of a camera module according to an example.

Referring to FIG. 1, a camera module 1 may include a first camera module 10a including a first lens barrel 100a, a first housing 200a for accommodating the first lens barrel 100a, and a first case 300a coupled to the first housing 200a, and a second camera module 10b including a second lens barrel 100b, a second housing 200b for accommodating the second lens barrel 100b, and a second case 300b coupled to the second housing 200b.

The first camera module 10a and the second camera module 10b may be mounted on one printed circuit board, or may be mounted on different printed circuit boards.

Since configurations of the first camera module 10a and the second camera module 10b are similar, the first camera module 10a will mainly be described, and redundant descriptions will be omitted.

The first lens barrel 100a may be formed in a hollow cylindrical shape, and a plurality of lenses for capturing a subject may be accommodated therein, and the plurality of lenses may be mounted on the first lens barrel 100a in the optical axis direction. As many of the plurality of lenses as necessary may be disposed according to a design of the first lens barrel 100a, and each lens has optical characteristics such as the same or a different refractive index.

The first camera module 10a may further include an image sensor for converting light incident through the first lens barrel 100a into an electrical signal. The image sensor is disposed below the first housing 200a. The image sensor may convert light incident through the first lens barrel 100a into an electrical signal. The image sensor may include a charge coupled device (CCD) and a complementary metal-oxide semiconductor (CMOS). The electrical signal converted by the image sensor is output as an image through a display unit of the electronic device. The image sensor is fixed to the printed circuit board and is electrically connected to the printed circuit board by wire bonding.

An infrared light filter may be provided above the image sensor. The infrared light filter blocks light in an infrared region among light incident through the first lens barrel 100a.

The first camera module 10a includes a first actuator for driving the first lens barrel 100a in an optical axis direction and two directions perpendicular to the optical axis direction. The first actuator includes an AF actuator for adjusting a focus and an OIS actuator for correcting shaking.

For example, the AF actuator may adjust the focus by moving the first lens barrel 100a in the optical axis direction (Z axis direction), and the OIS actuator may correct shaking during shooting by moving the first lens barrel 100a in two directions perpendicular to the optical axis direction (X axis direction and Y axis direction).

The first housing 200a may be formed to have opened upper and lower portions, and the first lens barrel 100a and the first actuator may be accommodated in an internal space of the first housing 200a. The first case 300a may be coupled to the first housing 200a to surround the upper portion of the first housing 200a, and may protect internal components of the first camera module 10a. In addition, the first case 300a may shield electromagnetic waves so that electromagnetic waves generated by the camera module do not affect other electronic components in the electronic device. In addition, the first case 300a may shield electromagnetic waves so that electromagnetic waves generated by other electronic components do not affect the camera module.

Figure 2:
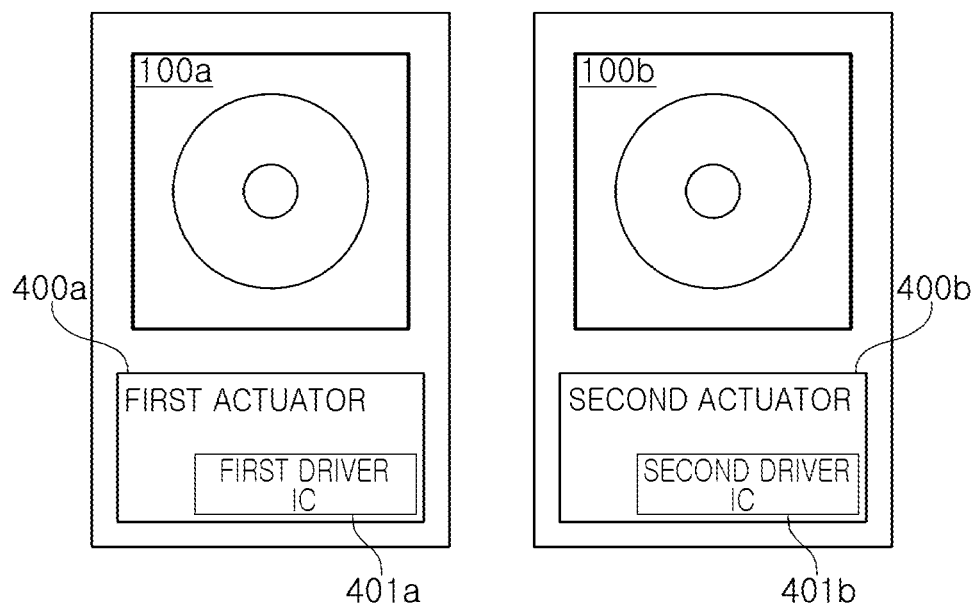
FIG. 2 is a block diagram of a camera module according to an example.

FIG. 2 is a block diagram of a camera module according to an example.

Referring to FIG. 2, a camera module 1 may include a first camera module 10a including a first lens barrel 100a and a first actuator 400a for driving the first lens barrel 100a in a direction perpendicular to an optical axis and a second camera module 10b including a second lens barrel 100b and a second actuator 400b for driving the second lens barrel 100b in a direction perpendicular to an optical axis. The first actuator 400a may include a first driver IC 401a, and the second actuator 400b may include a second driver IC 401b.

Figure 3:
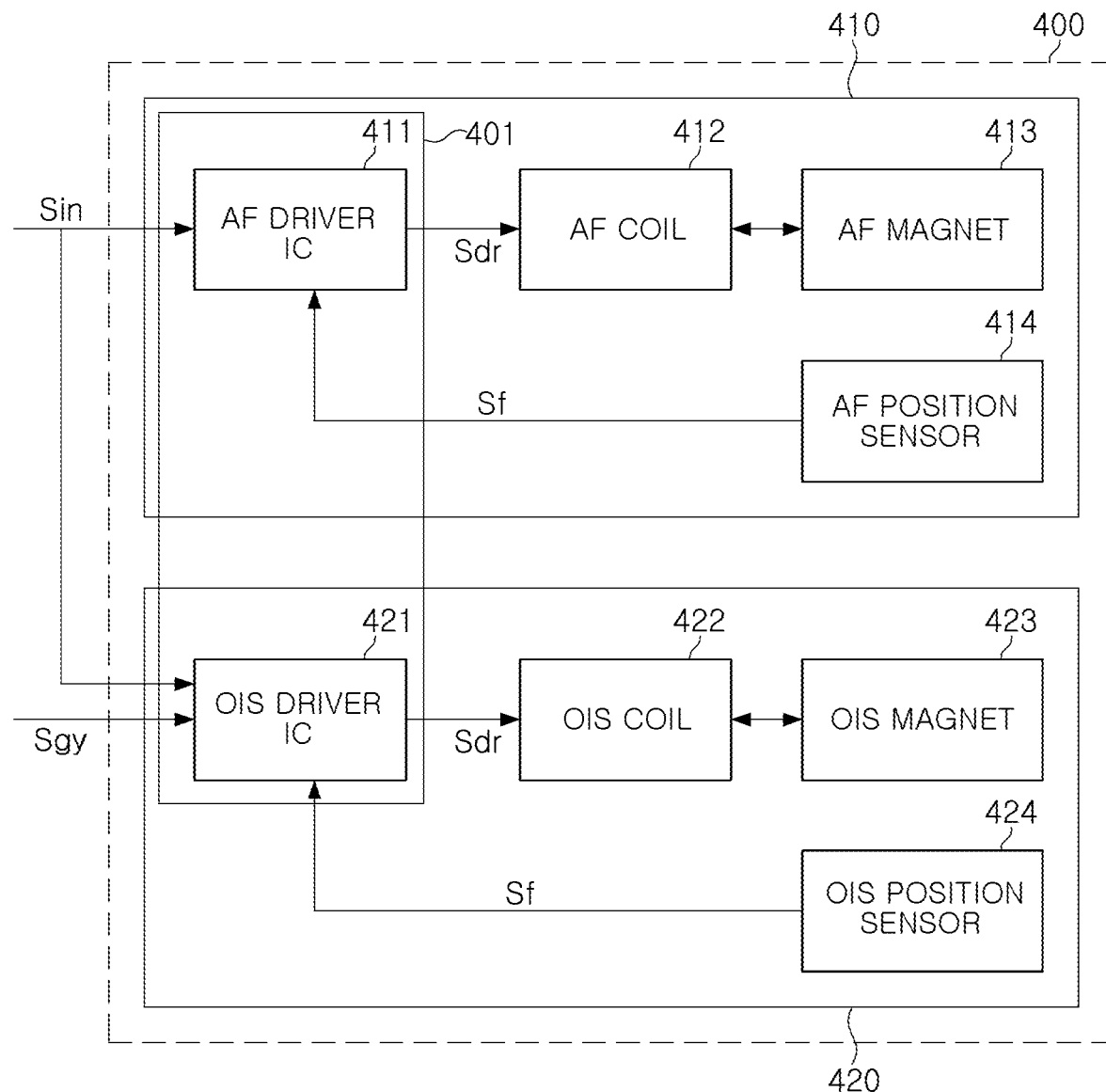
FIG. 3 is a block diagram of an actuator according to an example.

FIG. 3 is a block diagram of an actuator according to an example. Hereinafter, a driving method of the actuator according to an example will be described in detail with reference to FIGS. 1 to 3.

An actuator 400 according to the example of FIG. 3 corresponds to one of the first actuator 400a and the second actuator 400b shown in FIG. 2.

Referring to FIG. 3, the actuator 400 includes an AF actuator 410 and an OIS actuator 420.

The AF actuator 410 includes an AF driver IC 411, an AF coil 412, an AF magnet 413, and an AF position sensor 414, and the OIS actuator 420 includes an OIS driver IC 421, an OIS coil 422, an OIS magnet 423, and an OIS position sensor 424.

A driver IC 401 may include an AF driver IC 411 of the AF actuator 410 and an OIS driver IC 421 of the OIS actuator 420, and the driver IC 401 corresponds to the first driver IC 401a and the second driver IC 401b shown in FIG. 2.

The AF driver IC 411 may generate a driving signal Sdr according to an input signal Sin and a feedback signal Sf, and provide the generated driving signal Sdr to the AF coil 412. For example, the input signal Sin may be disposed inside an electronic device employing a camera module, and may be provided from a host that controls an overall operation of the electronic device. The input signal Sin provided to the AF driver IC 411 may include information regarding a target position in the optical axis direction of the lens barrel.

The feedback signal Sf may be provided from the AF position sensor 414 which detects a current position of the lens barrel in the optical axis direction. For example, the AF position sensor 414 may include a hall element. The AF position sensor 414 may detect the current position of the lens barrel, through a current position of the AF magnet 413.

The AF driver IC 411 may be driven in a closed loop type manner that compares the input signal Sin and the feedback signal Sf. The closed loop type AF driver IC 411 may be driven in a direction to reduce an error between a target position included in the input signal Sin and a current position detected in the feedback signal Sf. Driving in a closed loop type manner is advantageous in that linearity, accuracy, and repeatability are improved, compared to an open loop system.

The AF driver IC 411 may include an H bridge circuit capable of driving in both directions to provide a driving signal Sdr to the AF coil 412 in a voice coil motor manner. The driving signal Sdr may be provided to the AF coil 412 in a form of a current or a voltage.

When the driving signal Sdr is applied to the AF coil 412, a lens barrel may move in the optical axis direction due to electromagnetic influence between the AF magnet 413 and the AF coil 412. For example, the AF magnet 413 may be mounted on one side of the lens barrel, and the AF coil 412 may be mounted on the housing to face the AF magnet 413. However, according to an example, the positions of the AF magnet 413 and the AF coil 412 may be interchanged.

The OIS driver IC 421 may generate a driving signal Sdr according to an input signal Sin, a gyro signal Sgy, and a feedback signal Sf, and may provide the generated driving signal Sdr to the OIS coil 422.

For example, the input signal Sin may be disposed inside an electronic device employing a camera module, and may be provided from a host that controls an overall operation of the electronic device. The input signal Sin provided to the OIS driver IC 421 may include information about a target position in a direction perpendicular to the optical axis of the lens barrel.

The gyro signal Sgy may be disposed in the camera module, and provided from a gyro sensor that detects shaking of the camera module or the electronic device. For example, the gyro signal Sgy may include shaking data. For example, the shaking data may include acceleration data and angular velocity data detected from shaking of the camera module or the electronic device.

The feedback signal Sf may be provided from the OIS position sensor 424 which detects a current position in a direction perpendicular to the optical axis of the lens barrel. For example, the OIS position sensor 424 may include a hall element. The OIS position sensor 424 may detect the current position of the lens barrel through the current position of the OIS magnet 423.

The OIS driver IC 421 may be driven in a closed loop type comparing the input signal Sin, the gyro signal Sgy, and the feedback signal Sf. The closed loop type OIS driver IC 421 may be driven in a direction reducing an error of a target position included in the input signal Sin, shaking information included in the gyro signal Sgy, and a current position detected in the feedback signal Sf. Driving in the closed loop type manner is advantageous in that linearity, accuracy, and repeatability are improved compared to an open loop system.

The OIS driver IC 421 may include an H bridge circuit capable of being driven in both directions to provide a driving signal Sdr to the OIS coil 422 in a voice coil motor manner. The driving signal Sdr may be provided to the OIS coil 422 in a form of a current of a voltage.

When the driving signal Sdr is applied to the OIS coil 422, the lens barrel may move in a direction perpendicular to the optical axis due to the electromagnetic influence between the OIS magnet 423 and the OIS coil 422. For example, two OIS magnets 423 are provided, one OIS magnet is mounted on the lens barrel, in a first direction perpendicular to the optical axis, and the other OIS magnet is mounted on the lens barrel, in a second direction perpendicular to the optical axis. In addition, two OIS coils may be provided, and each of the two OIS coils may be disposed to face each of the two OIS magnets. However, in some examples, the positions of the OIS magnet 423 and the OIS coil 422 may be changed.

For stable driving of the first actuator 400*a* and the second actuator 400*b* of the camera module 1, two memories storing the firmware data of each of the first driver IC 401*a* and the second driver IC 401*b* are required, and two gyro sensors for providing shaking data to each of the first driver IC 401*a* and the second driver IC 401*b* are required.

However, in order to reduce manufacturing costs of the camera module or the electronic device, and reduce the size, the number of memories storing firmware data and the number of gyro sensors for providing shaking data need to be limited.

Figure 4:
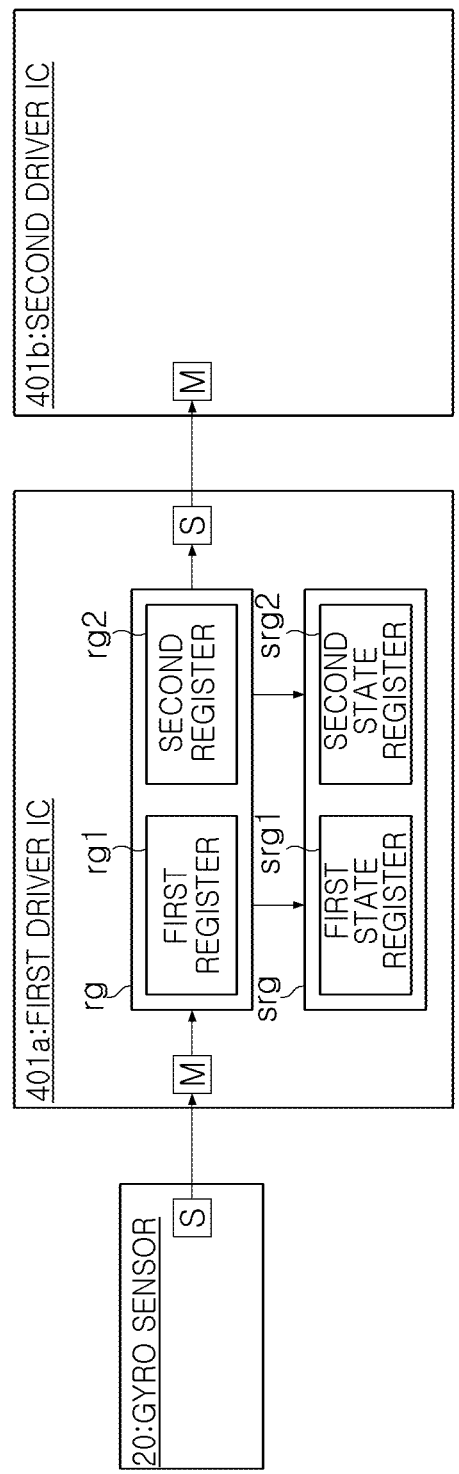
FIG. 4 is a block diagram of a first driver integrated circuit (IC), a second driver IC, and a gyro sensor provided to illustrate a method of communicating shaking data according to an example.

FIG. 4 is a block diagram of a first driver IC, a second driver IC, and a gyro sensor provided to illustrate a method of communicating shaking data according to an example.

Each of the first driver IC 401*a* and the second driver IC 401*b* may include a microcontroller unit (MCU). It can be understood that the operations of the first driver IC 401*a* and the second driver IC 401*b* to be described later are performed by a microcontroller unit (MCU) provided in each of the first driver IC 401*a* and the second driver IC 401*b*.

Referring to FIG. 4, the first driver IC 401*a* is connected to the gyro sensor 20, and the first driver IC 401*a* is connected to the second driver IC 401*b*. The gyro sensor 20 corresponds to one component of the camera module.

The shaking data generated by the gyro sensor 20 may be transferred to the first driver IC 401*a*, and the second driver IC 401*b* may receive the shaking data generated by the gyro sensor 20, through the first driver IC 401*a*. Each of the first driver IC 401*a* and the second driver IC 401*b* may perform an OIS operation by using shaking data.

The gyro sensor 20 and the first driver IC 401*a* may be connected through a communication line. As an example, the gyro sensor 20 and the first driver IC 401*a* may be connected through a serial peripheral interface bus (SPI) communication line to perform SPI communication.

In the communication of shaking data between the gyro sensor 20 and the first driver IC 401*a*, the first driver IC 401*a* operates as a master in the SPI communication, and the gyro sensor 20 operates as a slave in the SPI communication. Accordingly, a master port M is disposed in the first driver IC 401*a*, and a slave port S is disposed in the gyro sensor 20.

In FIG. 4, the master port M and the slave port S are schematically illustrated, but the master port M and the slave port S may include a master in slave out (MISO) pin, a master out slave in (MOSI) pin, a serial clock (SCLK) pin, and a slave select (SS) pin.

In the SPI communication, an operation of transferring specific data of the slave in the SPI communication to the master in the SPI communication may be understood as an operation of reading the specific data from the slave in the SPI communication.

The first driver IC 401*a* and the second driver IC 401*b* may be connected through a communication line. For example, the first driver IC 401*a* and the second driver IC 401*b* may be connected through a serial peripheral interface bus (SPI) communication line to perform SPI communication.

In the communication of the shaking data between the first driver IC 401*a* and the second driver IC 401*b*, the second driver IC 401*b* operates as a master in SPI communication, and the first driver IC 401*a* is a slave in SPI communication. The second driver IC 401*b* has a master port M, and the first driver IC 401*a* has a slave port S.

The first driver IC 401*a* may include a register unit (rg) storing shaking data transferred from the gyro sensor 20. For example, the register unit (rg) may include a first register (rg1) storing raw data and a second register (rg2) storing modified data. Here, the raw data corresponds to an original of the shaking data transferred from the gyro sensor 20, and the modified data is a processed copy of the shaking data processed by the first driver IC 401*a*.

One of the raw data and the modified data stored in the register (rg) may be transferred to the second driver IC 401*b*.

Figure 5:
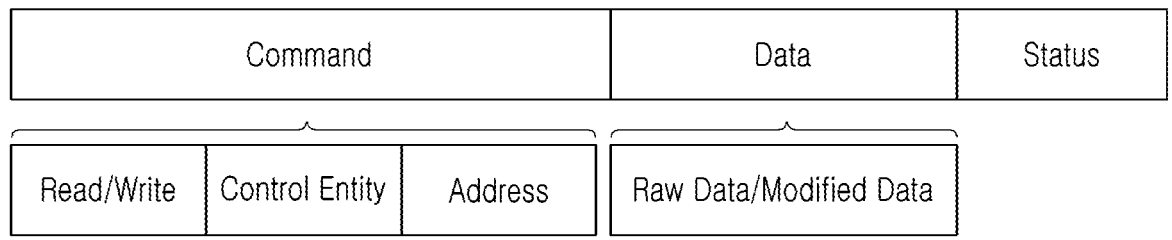
FIG. 5 illustrates a frame of a slave port of the first driver IC according to the example of FIG. 4.

FIG. 5 illustrates a frame of a slave port of the first driver IC 401*a* according to the example of FIG. 4.

Referring to FIG. 5, a frame of the slave port S of the first driver IC 401*a* may include a command, data, and a status.

The command may include read/write, control entity, and address information, and data may include raw data and modified data information.

According to the control entity of the command, data transferred to the master port M provided in the second driver IC 401*b* may be determined in the slave port S provided in the first driver IC 401*a*.

For example, when the control entity is the first driver IC 401a, the modified data may be transferred to the second driver IC 401b, and when the control entity is the second driver IC 401b, the raw data may be transferred to the second driver IC 401b.

For example, the control entity of the above-described command may be determined by a host for controlling an overall operation of the electronic device.

According to an example, the shaking data transferred from the first driver IC 401a to the second driver IC 401B may be determined, and the type of the transferred data may be flexibly changed.

The first driver IC 401a may include a state register unit (srg) for recording a change in the shaking data stored in the register unit (rg).

When the shaking data stored in the register unit (rg) is changed, a state value of the state register unit (srg) may be changed. When the state value of the state register unit (srg) is changed, the first driver IC 401a may generate an interrupt signal and provide the generated interrupt signal to the second driver IC 401b.

The interrupt signal may be provided from the first driver IC 401a to the second driver IC 401b through a master in slave out (MISO) pin. When the second driver IC 401b receives the interrupt signal, the second driver IC 401b may read shaking data from the register unit (rg) of the first driver IC 401a.

For example, the state register unit (srg) may include a first state register (srg1) that records the change in the raw data stored in the first register (rg1) and a second state register (srg2) that records the change in the modified data stored in the second register (rg2).

When the raw data is changed, the state value of the first state register (srg1) may be changed, and when the modified data is changed, the state value of the second state register (srg2) may be changed.

The first register (rg1) is composed of a plurality of bits, and the first state register (srg1) is composed of a plurality of bits corresponding to the plurality of bits of the first register (rg1). In addition, the second register (rg2) is composed of a plurality of bits, and the second state register (srg2) is composed of a plurality of bits corresponding to the plurality of bits of the second register (rg2).

When data of a specific bit among a plurality of bits of the first register (rg1) is changed, a state value of a specific bit of the first state register (srg1) corresponding to the specific bit of the first register (rg1) may be changed.

In addition, when data of a specific bit among a plurality of bits of the second register (rg2) is changed, a state value of a specific bit of the second state register (srg2) corresponding to the specific bit of the second register (rg2) may be changed.

When at least one of the state value of the first state register (srg1) and the state value of the second state register (srg2) is changed, the first driver IC 401a may generate an interrupt signal, and may provide the generated interrupt signal to the second driver IC 401b.

For example, the interrupt signal may be provided from the first driver IC 401a to the second driver IC 401b through a master in slave out (MISO) pin. When the second driver IC 401b receives the interrupt signal, the second driver IC 401b may read data from a register whose data is changed among the first register (rg1) and the second register (rg2) of the first driver IC 401a.

According to an example, when the second driver IC 401b receives an interrupt signal, the second driver IC 401b may read shaking data from a register (rg) unit of the first driver IC 401a, and thus, may reduce a time loss compared to a method of periodically reading the shaking data.

When the second driver IC 401b reads the shaking data from the register (rg) unit, a state value of a state register (srg) unit may be initialized.

For example, when the second driver IC 401b reads the shaking data from any bit of a plurality of bits of the register (rg) unit, any bit in the state register (srg) unit, corresponding to any bit of the register (rg) unit may be initialized.

As another example, when the second driver IC 401b reads shaking data from a specific bit of the register (rg) unit corresponding to the specific bit of the state register (srg) unit in which the state value is changed, all bits of the state register (srg) unit may be initialized.

As another example, at an end of the frame of the master port M of the second driver IC 401b, all of the bits of the state register (srg) unit may be initialized.

Figure 6:
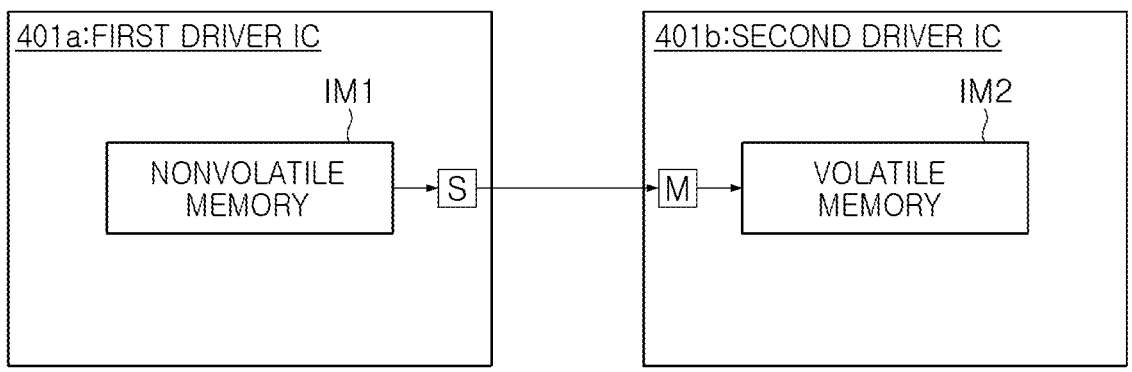
FIG. 6 is a block diagram of a first driver IC and a second driver IC, provided to illustrate a method of communicating firmware data according to an example.

FIG. 6 is a block diagram of a first driver IC and a second driver IC provided to illustrate a method of communicating firmware data according to an example.

Referring to FIG. 6, the first driver IC 401a is connected to the second driver IC 401b through a communication line. For example, the first driver IC 401a and the second driver IC 401b may be connected to a serial peripheral interface bus (SPI) communication line to perform SPI communication.

In the communication of firmware data of the first driver IC 401a and the second driver IC 401b, the second driver IC 401b operates as a master in SPI communication, and the first driver IC 401a operates as a slave in SPI communication. A master port M is disposed in the second driver IC 401b, and a slave port S is disposed in the first driver IC 401a.

The first driver IC 401a includes a nonvolatile memory IM1 storing firmware data. The firmware data stored in the nonvolatile memory IM1 may include first firmware data for driving the first driver IC 401a and second firmware data for driving the second driver IC 401b. For example, each of the first firmware data and the second firmware data may include data for autofocusing (AF) and optical image stabilization (OIS).

For example, the nonvolatile memory IM1 of the first driver IC 401a may include a flash memory. Even when power is not supplied to the first driver IC 401a since the nonvolatile memory IM1 of the first driver IC 401a is implemented as a flash memory, firmware data stored in the flash memory may be maintained.

The second driver IC 401b may include a volatile memory IM2. The second firmware data stored in the nonvolatile memory IM1 of the first driver IC 401a may be transferred to the second driver IC 401b and stored in the volatile memory IM2. The second driver IC 401b may read the second firmware data stored in the nonvolatile memory IM1 of the first driver IC 401a, and may store it in the volatile memory IM2.

For example, the volatile memory IM2 of the second driver IC 401b may include a static random access memory SRAM. The volatile memory IM2 of the second driver IC 401b is implemented as SRAM, such that the size of the memory may be reduced, and the volatile memory IM2 may operate at a high speed, such that the second driver IC 401b may be driven quickly by the second firmware data.

Figure 7:
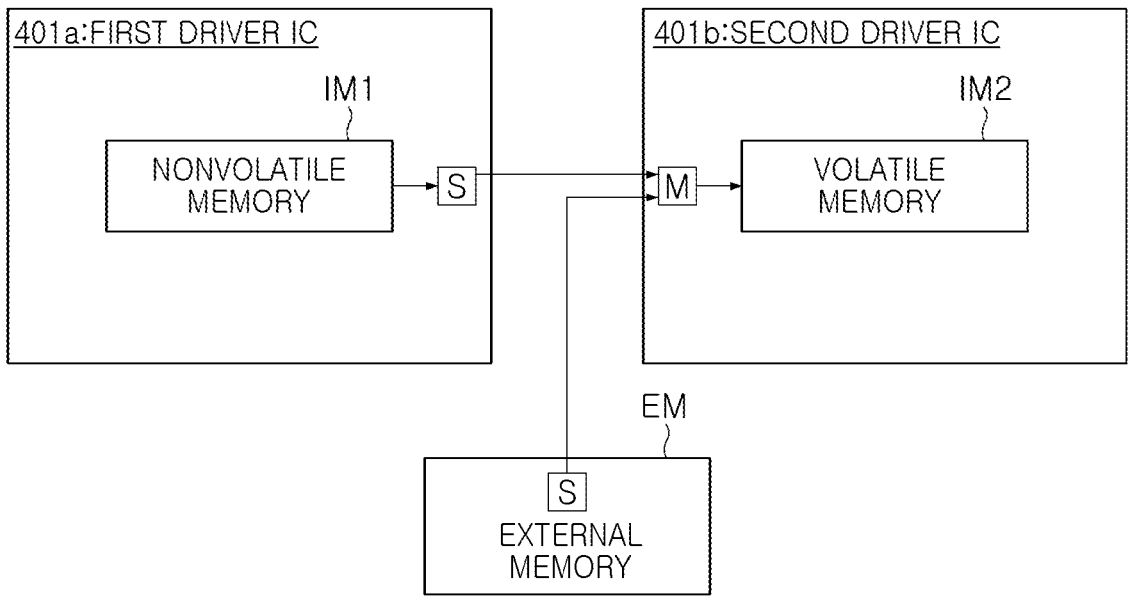
FIG. 7 is a block diagram of a first driver IC, a second driver IC, and an external memory, provided to illustrate a method of communicating firmware data according to an example.

FIG. 7 is a block diagram of a first driver IC, a second driver IC, and an external memory provided to illustrate a method of communicating firmware data according to another example.

Since the first driver IC 401a and the second driver IC 401b according to an example of FIG. 7 are similar to the first driver IC 401a and the second driver IC 401b according to the example of FIG. 6, redundant descriptions will be omitted, and descriptions will be provided based on differences.

An external memory EM may include an electrically erasable programmable read-only memory (EEPROM). The external memory EM corresponds to one component of the camera module.

The first driver IC 401a includes a nonvolatile memory IM1. The first firmware data for driving the first driver IC 401a may be stored in the nonvolatile memory IM1 of the first driver IC 401a.

Meanwhile, unlike the example of FIG. 6, in the example of FIG. 7, the second firmware data for driving the second driver IC 401b may be stored in one of the nonvolatile memory IM1 and the external memory EM of the first driver IC 401a.

The second driver IC 401b may determine which of the nonvolatile memory IM1 and the external memory EM of the first driver IC 401a is stored with the second firmware data, and may read the second firmware from the determined memory.

The second driver IC 401b includes a volatile memory IM2 storing the read second firmware data.

Referring to FIG. 7, the first driver IC 401a and the second driver IC 401b may be connected to a connection line. For example, the first driver IC 401a and the second driver IC 401b may be connected through a serial peripheral interface bus (SPI) communication line to perform SPI communication.

In the communication of the firmware data of the first driver IC 401a and the second driver IC 401b, the second driver IC 401b operates as a master in SPI communication, and the first driver IC 401a is a slave in SPI communication. The second driver IC 401b has a master port M, and the first driver IC 401a has a slave port S.

The second driver IC 401b and the external memory EM may be connected through a communication line. For example, the second driver IC 401b and the external memory EM may be connected through a serial peripheral interface bus (SPI) communication line, to perform SPI communication.

In communication of the firmware data of the second driver IC 401b and the external memory EM, the second driver IC 401b operates as a master in SPI communication, and the external memory EM operates as a slave in SRI communication. The second driver IC 401b has master port M, and the external memory EM has a slave port S.

Figure 8:
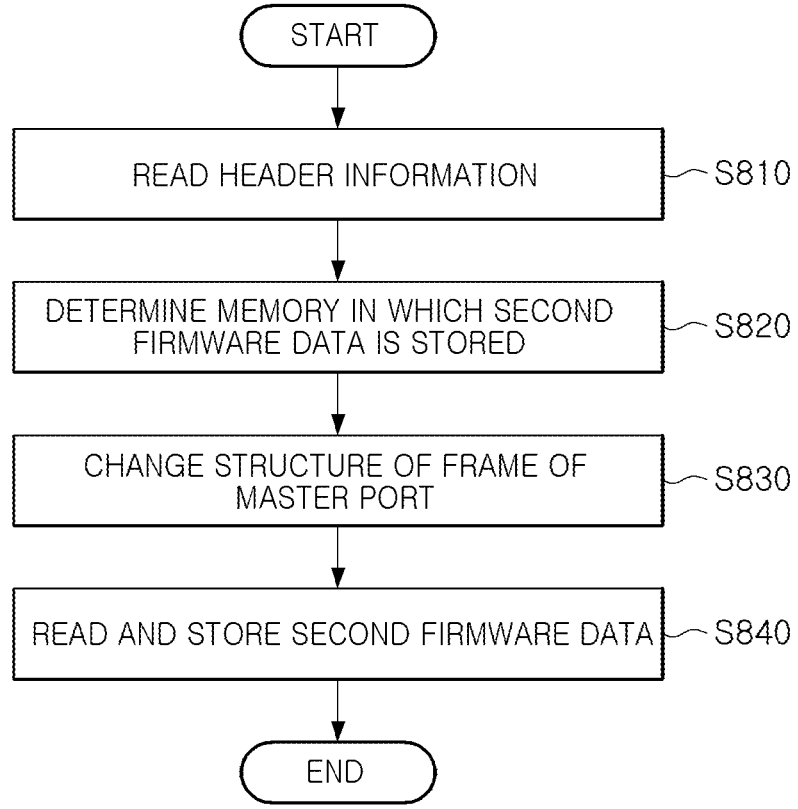
FIG. 8 is a flowchart illustrating a method of reading and writing second firmware data of a second driver IC according to an example.

FIG. 8 is a flowchart illustrating a method of reading and writing second firmware data of a second driver IC according to an example.

Referring to FIG. 8, the second driver IC 401b reads header information of the nonvolatile memory IM1 and the external memory EM of the first driver IC 401b (S810).

The second driver IC 401b determines which of the nonvolatile memory IM1 and the external memory EM of the first driver IC 401a is stored with the second firmware data from a header information of the nonvolatile memory IM1 and the external memory EM of the first driver IC 401a (S820). For example, the header information may include information such as a command code, an address size, and the like.

The second driver IC 401b changes a structure of the frame of the master port M, in response to a memory in which the second firmware data is stored among the nonvolatile memory IM1 and the external memory EM (S830).

For example, when a memory in which the second firmware data is stored among the nonvolatile memory IM1 and the external memory EM is a nonvolatile memory IM1, the second driver IC 401b changes a frame structure of the master port M in the same format as a command, an address, an IDLE, and data. In addition, when the memory in which the second firmware data is stored among the nonvolatile memory IM1 and the external memory EM is an external memory EM, the second driver IC 401b changes the frame structure of the master port M in the same format as a command, an address, and data. Here, in the frame structure of the nonvolatile memory IM1, an IDLE interval corresponds to an interval required for obtaining the second firmware data from the nonvolatile memory IM1.

The second driver IC 401b may read the second firmware data after changing a structure of the frame of the master port M, in response to the memory in which the second firmware data is stored, and may read the second firmware data. The read second firmware data may be stored in a volatile memory IM2 (S840).

As set forth above, according to a camera module according to an example, a memory storing a gyro sensor and firmware data to which different driver ICs provide shaking data is shared, such that a manufacturing cost of the camera module and a size thereof may be reduced.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
    a gyro sensor configured to generate shaking data;
    a first driver integrated circuit IC configured to generate a driving signal to move a first lens barrel in at least one direction perpendicular to an optical axis direction, according to the shaking data; and
    a second driver IC configured to generate a driving signal to move a second lens barrel in at least one direction perpendicular to the optical axis direction, according to the shaking data,
    wherein the first driver IC comprises a register unit configured to store the shaking data transferred from the gyro sensor, and
    the shaking data stored in the register unit is transferred to the second driver IC.

2. The camera module of claim 1, wherein the first driver IC and the second driver IC are configured to perform serial peripheral interface bus (SPI) communication.

3. The camera module of claim 2, wherein the first driver IC includes a slave port of the SPI communication, and the second driver IC includes a master port of the SPI communication.

4. The camera module of claim 3, wherein the register unit comprises a first register configured to store raw data and a second register configured to store modified data, and
the raw data corresponds to an original copy of the shaking data transferred from the gyro sensor, and the modified data corresponds to a processed copy of the shaking data processed by the first driver IC.

5. The camera module of claim 4, wherein one of the raw data and the modified data is transferred to the second driver IC.

6. The camera module of claim 5, wherein data transferred to the second driver IC among the raw data and the modified data is determined according to a command information of a frame of the slave port.

7. The camera module of claim 3, wherein the first driver IC comprises a state register unit configured to record a change in the shaking data stored in the register unit.

8. The camera module of claim 7, wherein the first driver IC is configured to generate an interrupt signal in response to a state value of the register unit being changed.

9. The camera module of claim 8, wherein the first driver IC is configured to provide the interrupt signal to the second driver IC through a master in slave out (MISO) pin of the slave port.

10. The camera module of claim 9, wherein the second driver IC is configured to read the shaking data stored in the register unit, according to the interrupt signal.

11. A camera module comprising:
a first driver integrated circuit (IC) configured to generate a driving signal to move a first lens barrel in at least one of an optical axis direction and a direction perpendicular to the optical axis direction; and
a second driver IC configured to generate a driving signal to move a second lens barrel in at least one of the optical axis direction and a direction perpendicular to the optical axis direction,
wherein the first driver IC comprises a nonvolatile memory configured to store first firmware data for driving the first driver IC and second firmware data for driving the second driver IC,
the second firmware data is transferred to the second driver IC, and
the first driver IC and the second driver IC are configured to perform serial peripheral interface bus (SPI) communication.

12. The camera module of claim 11, wherein the second driver IC comprises a volatile memory configured to store the second firmware data.

13. A camera module comprising:
an external memory;
a first driver integrated circuit (IC) configured to generate a driving signal to move a first lens barrel in at least one of an optical axis direction and a direction perpendicular to the optical axis direction; and
a second driver IC configured to generate a driving signal to move a second lens barrel in at least one of the optical axis direction and a direction perpendicular to the optical axis direction,
wherein the first driver IC comprises a nonvolatile memory configured to store first firmware data for driving the first driver IC,
second firmware data for driving the second driver IC is stored in one of the external memory and the nonvolatile memory, and
the second driver IC is configured to determine a memory storing the second firmware data among the external memory and the nonvolatile memory, according to a header information of the external memory and the nonvolatile memory.

14. The camera module of claim 13, wherein the external memory includes a slave port of serial peripheral interface bus (SPI) communication,
the first driver IC includes a slave port of SPI communication, and
the second driver IC includes a master port of SPI communication.

15. The camera module of claim 13, wherein the second driver IC is configured to change a structure of a frame of the master port in response to a memory storing the second firmware data among the external memory and the nonvolatile memory.

* * * * *